(No Model.)
F. F. DRURY.
BICYCLE SADDLE.
No. 566,669.　　　　　　　　Patented Aug. 25, 1896.
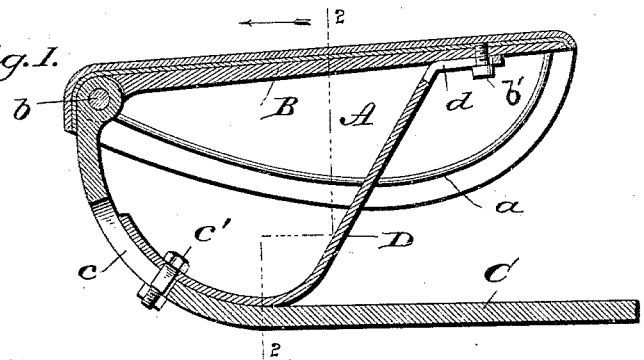
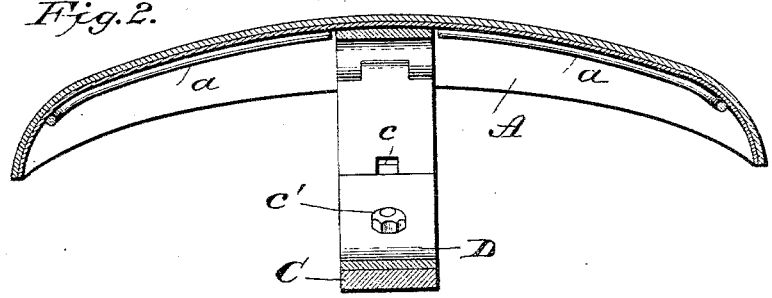
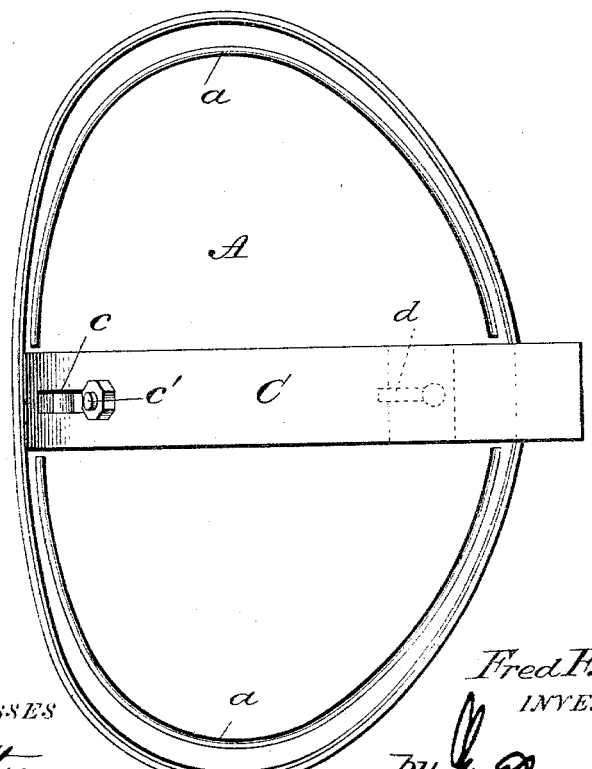
WITNESSES
Fred F. Drury
INVENTOR
by _____ Attorney

UNITED STATES PATENT OFFICE.

FREDERIC F. DRURY, OF GOUVERNEUR, NEW YORK.

BICYCLE-SADDLE.

SPECIFICATION forming part of Letters Patent No. 566,669, dated August 25, 1896.

Application filed January 30, 1896. Serial No. 577,372. (No model.)

*To all whom it may concern:*

Be it known that I, FREDERIC F. DRURY, a citizen of the United States of America, residing at Gouverneur, in the county of St. Lawrence and State of New York, have invented certain new and useful Improvements in Bicycle-Saddles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a more comfortable and anatomically-correct seat for bicycles than has heretofore been produced and in which the greatest resiliency of the springs of the seat will be at the forward portion thereof.

In carrying out my invention I make the seat-frame of rigid material, which is stamped or struck up to the proper shape, reinforced adjacent to its edges, and covered with a fabric or leather to provide a hard or rigid surface, the seat being secured to a longitudinal bar, which is pivoted at its rear end to a curved flat spring-bar, which is attached in any suitable manner to the seat-post of the bicycle, a second spring being movably connected to the forward part of the seat or bar thereof and adjustably secured to the other spring, all as will be hereinafter fully set forth, and particularly pointed out in the claims.

In the accompanying drawings, forming part of this specification, Figure 1 is a longitudinal sectional view of a bicycle saddle or seat constructed in accordance with my invention. Fig. 2 is a transverse sectional view on the line 2 2 of Fig. 1, and Fig. 3 is an inverted plan view of the seat.

A designates the seat proper, which is stamped from sheet metal or other rigid material to properly conform to the anatomy of the part of the body that comes in contact therewith, the side edges being bent downward to give greater rigidity to the plate and present a curved surface.

To the center of the rigid seat-plate A is secured a longitudinal bar B, which preferably tapers from its rear end forward, and said bar is provided at its rear end with eyes through which passes a pintle $b$ for connecting thereto a spring C, which is comparatively rigid. The spring C is curved, as shown in Fig. 1, and is provided at a suitable point from its rear end with a longitudinal slot $c$, adapted to receive a bolt $c'$.

D designates a spring which is bent at its upper end to bear against the bar B, to which it is connected by a screw $b'$, which passes through a slot $d$ therein. The spring D extends downward and rearward from the seat and is curved at its lower end to conform to the curved portion of the spring C, to which it is adjustably secured by the bolt $c'$, hereinbefore mentioned. By this arrangement or manner of connecting the spring D to the other parts of the saddle the forward part of the seat can be readily tilted by adjusting the bolt $c'$, and in use the slot $d$ will permit a sufficient play of said spring.

It will be noted that the spring D has the greatest resiliency, so as to allow a greater spring movement at the forward part of the seat, the spring C being resilient to the extent of allowing the whole saddle to give.

I am aware that prior to my invention bicycle-saddles were constructed having two springs connected to the front and rear ends of the seat, so that the flexible portion of the seat would be kept stretched, the seat being adjustable to change the inclination thereof, and I do not therefore claim such construction, broadly, as my invention; but What I do claim as new, and desire to secure by Letters Patent, is—

1. A bicycle-saddle consisting of a rigid seat to which is centrally secured a longitudinal bar, a curved spring pivoted to the rear end of the bar and adapted to be attached to a seat post or support, together with a spring D secured to the rear portion of the curved spring, and means for connecting the spring D movably to the forward part of the seat, substantially as shown and for the purpose set forth.

2. The combination in a bicycle-saddle, of a rigid seat-plate, a curved spring C pivoted to the rear end of the same, and a spring D of greater resiliency than the spring C, the spring D being secured to the rear portion of the spring C and movably connected to the forward part of the seat, substantially as shown and for the purpose set forth.

3. The combination in a bicycle-saddle, of a rigid seat struck up or stamped from a single piece, a longitudinal bar B secured to the center of the seat, a curved spring C pivoted to the rear end of the bar B and provided with a longitudinal slot $c$, and a spring D bent at its upper end to bear against the under side of the bar, said bent end being provided with a slot; together with a bolt $c'$ for securing the spring D adjustably to the spring C, and a screw $b'$ for connecting the spring D movably to the seat, substantially as shown and for the purpose set forth.

4. The combination in a bicycle-saddle, of a rigid seat struck up or stamped from a single piece, a longitudinal bar B secured to the center of the seat, a curved spring C pivoted to the rear end of the bar B and provided with a longitudinal slot $c$ in its curved portion, and a spring D bent at its upper end to bear against the under side of the bar and curved at its lower end to conform with the curve of the spring C, the upper end of the spring D having a longitudinal slot $d$ therein; together with a bolt $c'$ for securing the spring D adjustably to the spring C, and a screw $b'$ which passes through the slot $d$ and engages the bar B for holding the spring D in movable engagement therewith, substantially as shown and for the purpose set forth.

In testimony whereof I affix my signature in presence of two witnesses.

FREDERIC F. DRURY.

Witnesses:
 J. E. McFerran,
 G. E. Hutton.